US012693634B2

(12) United States Patent
Liu

(10) Patent No.: US 12,693,634 B2
(45) Date of Patent: Jul. 28, 2026

(54) METHOD FOR UNIFYING TIME IN WIDE AREA OF SPACE, SPACE TIME-KEEPING SYSTEM

(71) Applicant: BEIJING ORIENTAL INSTITUTE OF MEASUREMENT AND TEST, Beijing (CN)

(72) Inventor: Min Liu, Beijing (CN)

(73) Assignee: BEIJING ORIENTAL INSTITUTE OF MEASUREMENT AND TEST, Beijing (CN)

( * ) Notice: Subject to any disclaimer, the term of this patent is extended or adjusted under 35 U.S.C. 154(b) by 626 days.

(21) Appl. No.: 18/014,085

(22) PCT Filed: May 20, 2021

(86) PCT No.: PCT/CN2021/094770
§ 371 (c)(1),
(2) Date: Dec. 30, 2022

(87) PCT Pub. No.: WO2022/001458
PCT Pub. Date: Jan. 6, 2022

(65) Prior Publication Data
US 2024/0061378 A1 Feb. 22, 2024

(30) Foreign Application Priority Data
Jun. 29, 2020 (CN) ........................ 202010607333.6

(51) Int. Cl.
*G04F 5/16* (2006.01)
*G04G 7/00* (2006.01)

(52) U.S. Cl.
CPC *G04F 5/16* (2013.01); *G04G 7/02* (2013.01)

(58) Field of Classification Search
CPC .............. G04F 5/16; G04G 7/02; G04G 7/00
See application file for complete search history.

(56) References Cited

U.S. PATENT DOCUMENTS

2019/0332067 A1 10/2019 Zhao et al.
2020/0088754 A1* 3/2020 MacLeod ............... G06F 16/23

FOREIGN PATENT DOCUMENTS

CN 101603831 A 12/2009
CN 101750617 A 6/2010
(Continued)

OTHER PUBLICATIONS

The International Search Report of PCT/CN2021/094770.
(Continued)

*Primary Examiner* — Stephen D Meier
*Assistant Examiner* — Leo T Hinze

(57) ABSTRACT

A method for unifying a time in a wide area of space, and a space time-keeping system. The method comprises: establishing a wide-area inertial coordinate system, wherein the wide-area inertial coordinate system comprises all local area coordinate systems within a space range covered by a unified time (S101); obtaining an original local time, and establishing a local orbital parameter ephemeris by using the original local time as a time independent variable (S102); observing a pulse profile of a pulsar according to the original local time, and determining a local pulse time, wherein the local pulse time is a coordinate time when a pulse of the pulsar arrives at a local moment (S103); and converting the local pulse time by using the local orbital parameter ephemeris, so as to obtain a pulse origin time.

7 Claims, 7 Drawing Sheets

(56) References Cited

FOREIGN PATENT DOCUMENTS

| | | | |
|---|---|---|---|
| CN | 102540127 | A | 7/2012 |
| CN | 102759885 | A | 10/2012 |
| CN | 103293535 | A | 9/2013 |
| CN | 104848862 | A | 8/2015 |
| CN | 108981750 | A | 12/2018 |
| CN | 109001972 | A | 12/2018 |
| CN | 110780583 | A | 2/2020 |
| CN | 111665709 | A | 9/2020 |
| DE | 60309710 | T2 | 9/2007 |
| JP | 2004191351 | A | 7/2004 |

OTHER PUBLICATIONS

The Written Opinion of PCT/CN2021/094770.
Liu, Min et al., "Time Unit and Time Measurement in Space Metrology", Journal Electronic Measurement and Instrumentation, Aug. 31, 2016.

* cited by examiner

METHOD FOR UNIFYING TIME IN WIDE AREA OF SPACE, SPACE TIME-KEEPING SYSTEM

CROSS-REFERENCE TO RELATED APPLICATIONS

This Application is a national stage application of PCT/CN2021/094770. The present application is based on PCT Application No. PCT/CN2021/094770, filed May 20, 2022, and from Chinese patent application No. 202010607333.6 filed on Jun. 30, 2020, and claims priority thereto. The entire applications of this PCT application and Chinese patent application are incorporated herein by references.

TECHNICAL FIELD

The present disclosure relates to time metrology technology, and in particular to a method for unifying time in a wide area space and a space timekeeping system.

BACKGROUND

The measurement and rules of time are the common language of humans. Timekeeping is a technology that establishes and keeps a time reference and can measure time continuously. Time dissemination is a technology that transmits time information and synchronizes a user's time with a standard time. Humans have agreed on two rules for unifying time on the earth and in its vicinity: the first agreement is time unit; for example, the Second of International System of Units (SI second) was defined by the General Conference on Weights and Measures, that is, between the hyperfine energy levels of the cesium-133 atom, the time of 9192631770 cycles of the microwaves radiated by electron transition is defined as 1 second; the second agreement is a beginning moment of the time; the current Gregorian calendar specifies the day one week after the birth of Jesus as January 1, $1^{st}$ year, $1^{st}$ century.

In the existing timekeeping technology, on the geoid, the SI second is reproduced by cesium atomic clocks in dozens of timekeeping laboratories around the world to measure a local atomic time; then the time and frequency measurement room of the International Bureau of Weights and Measures collects the atomic time data from various places and performs weighted averaging to generate an International Atomic Time; then the leap second increased due to the deceleration of the earth's rotation is added to form a Coordinated Universal Time. The Coordinated Universal Time is used as the standard time on the earth, and a time service signal thereof is issued by timekeeping agencies in various places. This timekeeping-timeservicing technology requires that the time of all users be synchronized with the standard time. However, due to the influence of gravitational potential and relativistic effect such as relative velocity, there is no simultaneity between different coordinate systems, and the simultaneity is only defined in the same one coordinate system. The existing timekeeping-timeservicing technology on the earth cannot unify time across different coordinate systems, so how to unify time of the earth, celestial bodies and spacecrafts is still an unsolved problem.

Although the time of deep space probes such as the moon, Mars and Jupiter probes is approximately synchronized with the time of ground station, and the approximate synchronization of the time of the spacecrafts with the ground is realized by using the ground time dissemination, they are all single and independent systems which establish a system of their own. The spacecrafts and the like cannot generate the standard time by themselves and cannot be timekeeping systems.

SUMMARY

Embodiments of the present disclosure provide a method for unifying time in a wide area space, a space timekeeping system, and a storage medium, so as to solve the problems that the existing timekeeping-timeservicing technology cannot unify time across different coordinate systems, and the celestial bodies and spacecrafts other than the earth cannot be accurately timed due to the influence of the relativistic effect.

A first aspect of the embodiments of the present disclosure provides a method for unifying time in a wide area space, which includes:

- establishing a wide area inertial coordinate system, which includes all local area coordinate systems within a spatial range covered by a unified time;
- obtaining a local proper time, and establishing a local orbit parameter ephemeris by taking the local proper time as a time argument;
- observing a pulse profile of a pulsar according to the local proper time, and determining a pulse local time, in which the pulse local time is a coordinate time at which the pulse of the pulsar arrives at a local position; and
- converting the pulse local time by using the local orbit parameter ephemeris so as to obtain a pulse origin time, in which the pulse origin time is a coordinate time at which the pulse arrives at an origin of the wide area inertial coordinate system.

In some embodiments, the method for unifying time in the wide area space further includes:

- determining an initial epoch of the pulsar, in which the initial epoch is a coordinate time at which the pulse with serial number 0 arrives at the origin of the wide area inertial coordinate system; and
- establishing a pulsar ephemeris according to the initial epoch, in which the pulsar ephemeris includes a name of the pulsar, an azimuth vector of the pulsar, the pulse profile of the pulsar, an initial phase of the pulse profile, a zero-phase model of the pulse profile, a pulse period of the pulsar, a correction value of the pulse period, and a correction value of the initial phase.

In some embodiments, an expression of the pulse origin time of the pulse with serial number n includes:

$$to_n = n(T+\Delta T)+(p+\Delta p);$$

where $to_n$ is the pulse origin time of the pulse with serial number n, T is the pulse period of the pulsar, $\Delta T$ is the correction value of the pulse period, p is the initial phase of the pulse profile, and $\Delta p$ is the correction value of the initial phase.

In some embodiments, the observing the pulse profile of the pulsar according to the local proper time and determining the pulse local time includes:

- observing the pulse profile of the pulsar, and obtaining a pulse data sequence with the local proper time as the time argument;
- converting the pulse data sequence with the local proper time as the time argument into a pulse data sequence with a local coordinate time as the time argument, according to the local orbit parameter ephemeris and the azimuth vector of the pulsar; and
- performing pulse profile superposition calculation or cross-correlation calculation on the pulse data sequence with the local coordinate time as the time argument to obtain the pulse local time.

In some embodiments, the local orbital parameter ephemeris includes: a local position vector, a local velocity vector, and a local gravitational potential;

correspondingly, the converting the pulse data sequence with the local proper time as the time argument into the pulse data sequence with the local coordinate time as the time argument according to the local orbit parameter ephemeris and the azimuth vector of the pulsar includes:

transforming a time axis of the local proper time to obtain a first time axis by using the Doppler effect formula, the local velocity vector and the azimuth vector of the pulsar;

transforming the first time axis to obtain a time axis of the local coordinate time by using the relativistic effect, the local velocity vector and the local gravitational potential; and determining the pulse data sequence with the local coordinate time as the time argument according to the time axis of the local coordinate time.

In some embodiments, the transforming the time axis of the local proper time to obtain the first time axis by using the Doppler effect formula, the local velocity vector and the azimuth vector of the pulsar includes:

obtaining a time interval $\Delta\tau_a$ of the first time axis by using:

$$\Delta\tau_a = \left(1 + \frac{V_a}{c}\right)\Delta\tau,\ V_a = \vec{a}\cdot\vec{V};$$

where $V_a$ is a local movement velocity relative to the pulsar, $\vec{V}$ is the local velocity vector, $\vec{a}$ is the azimuth vector of the pulsar, $\Delta\tau$ is a time interval of the time axis of the local proper time, and c is the velocity of light.

In some embodiments, the transforming the first time axis to obtain the time axis of the local coordinate time by using the relativistic effect, the local velocity vector and the local gravitational potential includes:

obtaining a time interval $\Delta t$ of the time axis of the local coordinate time by using:

$$\Delta t = \int_{\tau}^{\tau+\Delta\tau_a}\left(1 + \frac{U}{c^2} + \frac{V^2}{2c^2}\right)d\tau;$$

where t is a time variable of the local coordinate time, $\tau$ is a time variable of the local proper time, $\Delta\tau_a$ is a time interval of the first time axis, U is the local gravitational potential, V is a linear velocity of the local position relative to the wide area inertial coordinate system determined according to the local velocity vector, and c is the velocity of light.

In some embodiments, the converting the pulse local time by using the local orbit parameter ephemeris to obtain the pulse origin time includes:

obtaining the pulse origin time to n of the pulse with serial number n by using:

$$to_n = t_n + d_n/c,\ d_n = (\vec{P}\cdot\vec{a});$$

where $t_n$ is the pulse local time of the pulse with serial number n, $d_n$ is a distance from the local position at the moment $t_n$ to the origin of the wide area inertial coordinate system, $\vec{P}$ is the local position vector, $\vec{a}$ is the azimuth vector of the pulsar, and c is the velocity of light.

In some embodiments, after obtaining the pulse origin time, the method further includes:

broadcasting pulse serial number information to a plurality of local area timekeeping systems, so that each of the local area timekeeping systems corrects its own pulse origin time according to the pulse serial number information it receives, in which the pulse serial number information contains serial number of the current pulse and the pulse origin time corresponding to the serial number of the pulse; and acquiring the pulse serial number information sent by each of the local area timekeeping systems, and updating its own pulse origin time according to multiple pieces of pulse serial number information.

A second aspect of the embodiments of the present disclosure provides a space timekeeping system including a plurality of local area timekeeping systems, each of which includes an information processing device, a proper time measuring device, and a pulsar pulse measuring device;

the information processing device is configured to establish a wide area inertial coordinate system, which includes all local area coordinate systems within a spatial range covered by a unified time;

the proper time measuring device is configured to obtain a local proper time; and the information processing device is further configured to establish a local orbit parameter ephemeris by taking the local proper time as a time argument;

the pulsar pulse measuring device is configured to observe a pulse profile of a pulsar according to the local proper time to obtain a pulse data sequence with the local proper time as the time argument; and the information processing device is further configured to determine a pulse local time according to the pulse data sequence with the local proper time as the time argument, in which the pulse local time is a coordinate time at which the pulse of the pulsar arrives at a local position; and the information processing device is further configured to convert the pulse local time by using the local orbit parameter ephemeris so as to obtain a pulse origin time, in which the pulse origin time is a coordinate time at which the pulse arrives at an origin of the wide area inertial coordinate system.

In some embodiments, the information processing device of each local area timekeeping system is further configured to:

broadcast pulse serial number information to the plurality of local area timekeeping systems, so that each of the local area timekeeping systems corrects its own pulse origin time according to the pulse serial number information it receives, in which the pulse serial number information contains serial number of the current pulse and the pulse origin time corresponding to the serial number of the pulse; and acquire the pulse serial number information sent by each of the local area timekeeping systems, and update its own pulse origin time according to multiple pieces of pulse serial number information.

As compared with the prior art, the method for unifying time in a wide area space, the space timekeeping system and the storage medium according to the embodiments of the present disclosure have the following advantageous effects: first, a wide area inertial coordinate system is established, which includes all local area coordinate systems within a spatial range covered by a unified time, so that time unification is achieved among a plurality of independent local area timekeeping systems; then, a local proper time is obtained, and the local proper time is used as a time argument to establish a local orbit parameter ephemeris; a pulse profile of a pulsar is observed according to the local proper time, and a pulse local time of the pulsar is determined; then the local orbit parameter ephemeris is used to convert a coordinate time at which the pulse arrives at the local position to a coordinate time at which the pulse arrives at the origin of the wide area inertial coordinate system; the pulse origin time is used as the time in the wide area space to achieve the goal of unifying time so that the requirement of independent time measurement without relying on the time dissemination on the earth is met, which is suitable for other celestial bodies and spacecrafts than the earth.

BRIEF DESCRIPTION OF THE DRAWINGS

The accompanying drawings presented herein, which are incorporated into the description and constitute a part thereof, illustrate embodiments of the present disclosure, and together with the description, they serve to explain the principle of the embodiments of the present disclosure.

DETAILED DESCRIPTION OF THE INVENTION

For the purpose of illustration rather than limitation, specific details such as specific system structures and technologies are set forth in the following description, in order to enable a thorough understanding of the embodiments of the present disclosure. However, it will be apparent to those skilled in the art that the present disclosure may also be carried out in other embodiments without these specific details.

In order to illustrate the technical solutions described in the embodiments of the present disclosure, specific examples are used below for description.

Figure 1:
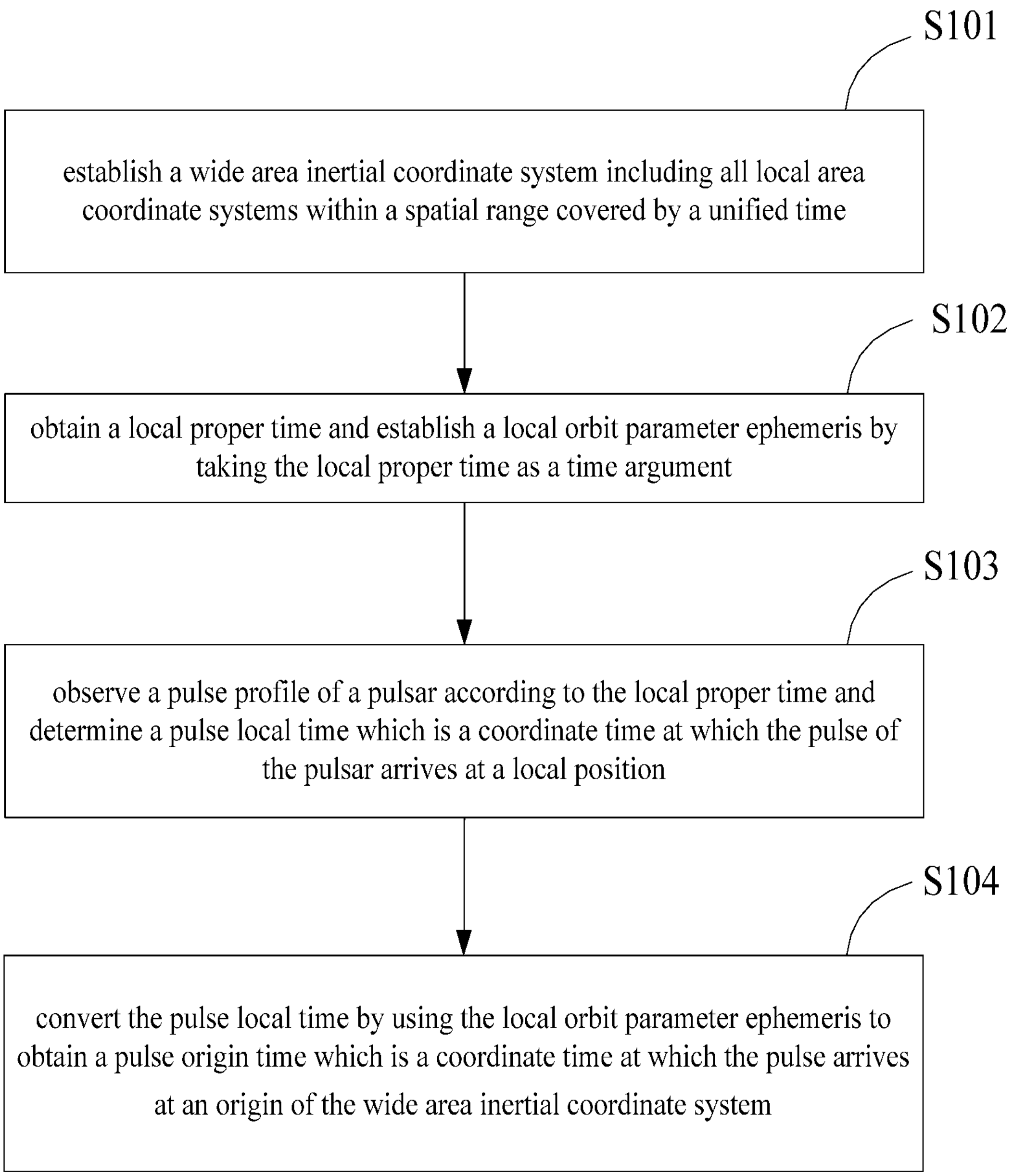
FIG. 1 is a schematic flowchart illustrating the implementation of a method for unifying time in a wide area space provided by an embodiment of the present disclosure.

Referring to FIG. 1, a schematic flowchart illustrating the implementation of an embodiment of the method for unifying time in a wide area space provided by an embodiment of the present disclosure is described in detail as follows.

Step S101: establishing a wide area inertial coordinate system, which includes all local area coordinate systems within a spatial range covered by a unified time.

The relativistic effect will cause the problem of different measured time between observers with different gravitational potentials and different velocities. When measuring time between different coordinate systems, the relativistic effect should be considered, but no solution to the problem has been proposed yet. At present, constructing a timekeeping system in a large-scale wide area space and time has been proposed in the related technical solutions, in which only a design idea is preliminarily given, and no specific implementation method is given, thus providing no practicability. By calculating the timing data of 12 pulsars from the Australian National Astronomical Observatory, it is found that there is a cumulative error in the International Atomic Time; however, the above calculation does not consider the influence of the relativistic effect on the time coordinate axis, but only performs the correction by taking the relativistic effect as a fixed term in the process of converting the coordinate time of the mass center of the solar system, which is not generally applicable to other celestial bodies. There are similar technical solutions relating to "synthetic pulsar time", but none of them deals with the problem of unifying time in a wide area.

Therefore, the embodiment of the present disclosure provides a method for unifying time in a wide area space, in which a wide area inertial coordinate system is established, and the time is expressed, transmitted and unified by using the coordinate time at which the pulse arrives at the origin of the wide area inertial coordinate system, which is suitable for any of the celestial bodies and spacecrafts other than the earth.

The inertia in the wide area inertial coordinate system means that a pointing direction of the coordinate axis cannot rotate relative to the pulsar, and the celestial bodies or spacecrafts in the coordinate system perform inertial orbital motion without being applied other forces than the gravitational force.

As an implementation, the principles of establishing a wide area inertial coordinate system in the embodiment of the present disclosure include but are not limited to the following: 1) a pulse period of the pulsar in the coordinate system is in a range of 1 ms~100 ms, and the period stability is better than 1E-18; 2) the pulse profiles of the pulsars in the coordinate system are clear, the pulse profiles are stable, and there is an inflection point that makes it easy to identify the profiles; 3) a pulse energy spectrum of the pulsars in the coordinate system has a wide distribution, which can not only be observed by ground radio astronomical telescopes, but also can be observed by X-ray antennas carried on the spacecrafts; 4) azimuths of the pulsars in the coordinate system are stable, and the photon energy is easy to detect; and 5) the number and distribution of the pulsars should ensure that there is at least one pulsar in a range of ±60° incident angle from any observation direction of the wide area inertial coordinate system, and if the azimuths are evenly distributed in the wide area inertial coordinate system, the number of pulsars should not be less than 14.

As an implementation, the origin of the wide area inertial coordinate system in the embodiment of the present disclosure is set at a mass center of the wide area. The mass center is also called the center of mass, which is the center of masses of all the celestial bodies within an action range of the gravitational potential. The gravitational potential of the mass center is zero. For example, the sun accounts for 99.86% of the mass of the solar system, Jupiter accounts for 0.13% of the mass of the solar system, and the sum of other planets accounts for less than 0.01% of the mass of the solar system. Therefore, the mass center of the solar system is not the mass center of the sun, and is located on a line connecting the sun and Jupiter. The method of the embodiment of the present disclosure is applicable to various situations such as the solar system mass center coordinate system, the Mars mass center coordinate system, and the earth mass center coordinate system, which all have the characteristics of a wide area inertial coordinate system within their respective ranges of gravitational potential. Therefore, in the embodiment of the present disclosure, this type of coordinate system is represented by a wide area inertial coordinate system.

Step S102: obtaining a local proper time, and establishing a local orbit parameter ephemeris by taking the local proper time as a time argument.

As an implementation, in the embodiment of the present disclosure, a proper time measuring device is used to obtain the local proper time, which is used for local time reference, and the local proper time is used as a time variable of the local orbit parameter ephemeris. The proper time measuring device is a measuring instrument defined for reproducing SI second. For example, the ground cesium atomic clocks can all measure the proper time, so the local proper time is the time measured locally in the unit of SI second, and this time is used as a local area timekeeping reference. A starting point of the local time can be agreed at the local position itself, or a moment close to the initial epoch of the pulsar can be selected. Since 1967, the General Conference on Weights and Measures has agreed to use cesium atomic clocks to reproduce SI second. In 2018, the Shanghai Institute of Precision Optics and Mechanics of the Chinese Academy of Sciences successfully tested the space cesium atomic clock by boarding the Tiangong-2 space laboratory, and a stability of 7.2E-16/s was reached. The space timekeeping system needs to meet the characteristics of low power consumption, miniaturization and long service life, so there is a need for further development and improvement in the prior art, which is also the future development direction of cesium atomic clocks. The current measurement requirement of time interval has reached the femtosecond level. Obviously, the microwave frequency standard represented by cesium atoms cannot meet the current femtosecond-level measurement traceability requirements in terms of both definition and principle. The new definition of second is being studied in the frontier field of metrology, and defining a new SI second with optical frequency becomes the future development direction. Therefore, if humans update the definition of SI second in the future, the proper time measuring device will also become the device recommended by the new definition. Therefore, the present disclosure is not limited to using the cesium atomic clock to define the unit of local proper time, that is, if humans have a new agreement on the time unit in the future, the proper time measuring device of the present disclosure will accordingly be changed to the newly agreed measuring instrument.

As an implementation, the local orbital parameter ephemeris in this embodiment of the present disclosure refers to a table of correspondence between periodic parameters of the orbital motion of the local mass center in the wide area inertial coordinate system and the local proper time. The periodic parameters include, but are not limited to, local position vector, local velocity vector, and local gravitational potential. Exemplarily, table 1 is a local orbit parameter ephemeris in the embodiment of the present disclosure. In the local orbit parameter ephemeris, the local proper time $\tau$ is used as index, and the orbit parameter information of the local position where the current local area timekeeping system is located relative to the origin of the wide area inertial coordinate system is listed at equal intervals, such as the local position vector $\vec{P}(x,y,z)$, the local velocity vector $\vec{V}(V_x,V_y,V_z)$ and the local gravitational potential U. These parameters vary with the local proper time $\tau$ and are periodic. For the convenience of calculation, the proper time in the table can be allocated at equal intervals. Let $\tau_i=\tau_{i-1}+\Delta\tau$ and the moment of the coordinate time corresponding to the local proper time is calculated. After ignoring the high-level minims of $c^3$ and above, a scale relationship between the time axis of the local proper time and the time axis of the local coordinate time is as follows:

$$\Delta t_i = \int_{\tau_i}^{\tau+\Delta\tau}\left(1+\frac{U(\tau)}{c^2}+\frac{V^2(\tau)}{2c^2}\right)d\tau,$$

$$V(\tau)=\sqrt{V_x^2(\tau)+V_y^2(\tau)+V_z^2(\tau)};$$

where $\Delta t_i$ is an unequally spaced step of the time axis of the local coordinate time, $\tau_i$ is the local proper time, $\Delta\tau$ is an equally spaced step of the time axis of the local proper time, $U(\tau)$ is the local gravitational potential, which can be found from the local orbit parameter ephemeris, $V(\tau)$ is a linear velocity of the local position relative to the wide area inertial coordinate system, $V_x(\tau)$ is a local velocity vector in the x-direction, $V_y(\tau)$ is a local velocity vector in the y-direction, and $V_z(\tau)$ is a local velocity vector in the z-direction, where $V_x(\tau)$, $V_y(\tau)$ and $V_z(\tau)$ can each be found from the local orbital parameter ephemeris, and c is the velocity of light.

TABLE 1 local orbit parameter ephemeris

| Local proper time | Coordinate time | Position x | Position y | Position z | Velocity Vx | Velocity Vy | Velocity Vz | Gravitational potential U |
|---|---|---|---|---|---|---|---|---|
| $\tau_0$ | $t_0$ | $x(\tau_0)$ | $y(\tau_0)$ | $z(\tau_0)$ | $V_x(\tau_0)$ | $V_y(\tau_0)$ | $V_z(\tau_0)$ | $U(\tau_0)$ |
| $\tau_1$ | $t_1 = t_0 + \Delta t_1$ | $x(\tau_1)$ | $y(\tau_1)$ | $z(\tau_1)$ | $V_x(\tau_1)$ | $V_y(\tau_1)$ | $V_z(\tau_1)$ | $U(\tau_1)$ |
| $\tau_2$ | $t_2 = t_1 + \Delta t_2$ | $x(\tau_2)$ | $y(\tau_2)$ | $z(\tau_2)$ | $V_x(\tau_2)$ | $V_y(\tau_2)$ | $V_z(\tau_2)$ | $U(\tau_2)$ |
| $\tau_3$ | $t_3 = t_2 + \Delta t_3$ | $x(\tau_3)$ | $y(\tau_3)$ | $z(\tau_3)$ | $V_x(\tau_3)$ | $V_y(\tau_3)$ | $V_z(\tau_3)$ | $U(\tau_3)$ |
| $\tau_4$ | $t_4 = t_3 + \Delta t_4$ | $x(\tau_4)$ | $y(\tau_4)$ | $z(\tau_4)$ | $V_x(\tau_4)$ | $V_y(\tau_4)$ | $V_z(\tau_4)$ | $U(\tau_4)$ |
| $\tau_5$ | $t_5 = t_4 + \Delta t_5$ | $x(\tau_5)$ | $y(\tau_5)$ | $z(\tau_5)$ | $V_x(\tau_5)$ | $V_y(\tau_5)$ | $V_z(\tau_5)$ | $U(\tau_5)$ |
| ... | | | | | | | | |

The periodic parameters in the local orbit parameter ephemeris in the embodiment of the present disclosure can be obtained by performing time coordinate axis transformation on the astronomical observation data; however, the general astronomical ephemeris is marked by the time on the earth, which is inconvenient for other local area timekeeping systems to use, and the time needs to be converted into the local time of other local area timekeeping systems, such as by referring to the above formula; the periodic parameters in the local orbit parameter ephemeris can also be obtained by continuously correcting according to the pulse serial number information of other local area timekeeping systems in the feedback process of timekeeping.

As an implementation, the linear velocity in the embodiment of the present disclosure is not limited to the linear velocity of the local position relative to the origin of the wide area inertial coordinate system. For example, the wide area inertial coordinate system is the solar system mass center coordinate system; for satellites orbiting the earth, if the local orbit parameter ephemeris is based on the earth mass center coordinate system, it needs to go through the time coordinate axis transformation process for two times to convert the coordinate time of the mass center of the earth into the coordinate time of the mass center of the solar system (convert the coordinate time at which the pulse arrives at the local position into the coordinate time at which the pulse arrives at the origin of the wide area inertial coordinate system): in the first time, the local orbit parameter ephemeris of the satellite orbiting the earth is used to convert the time axis of the proper time to the time axis of the coordinate time of the earth mass center, and the linear velocity at this point is the linear velocity of the satellite relative to the origin of the coordinate of the earth mass center; and in the second time, the orbital parameter ephemeris of the earth on the solar system mass center coordinate system is used to convert the coordinate time of the earth mass center into the coordinate time of the solar system mass center coordinate system again, and the linear velocity at this point is the linear velocity of the earth mass center relative to the origin of the solar system mass center coordinate system. If the local orbit parameter ephemeris is based on the solar system mass center coordinate system, the satellite only needs to go through the time axis transformation for one time to convert the first time axis into the time axis of the coordinate time. At this point, the linear velocity is the linear velocity of the satellite relative to the origin of the solar system mass center coordinate system.

Step S103: observing a pulse profile of a pulsar according to the local proper time, and determining a pulse local time, in which the pulse local time is a coordinate time at which the pulse of the pulsar arrives at a local position.

As an implementation, in the embodiment of the present disclosure, a pulsar pulse measuring device is used to observe the pulse profile of the pulsar, and the pulse local time is the coordinate time at which the pulse of the pulsar arrives at the local position, i.e., the moment represented by the time axis of the local coordinate time. The pulsar pulse measuring device is a device which can receive the energy of a certain band of electromagnetic waves emitted from the pulsar, and which uses an energy amplitude sequence represented corresponding to the local proper time as measurement data of the pulse profile. For example, the large-scale ground radio astronomical telescope, FAST (Five-hundred-meter Aperture Spherical Telescope) in Guizhou province, China, is the largest radio astronomical telescope in the world. For another example, the pulsar pulse measuring device can be antennas for measuring X-rays on satellites.

Specifically, the pulse local time $t_n$ is a corresponding moment of a zero-phase point of the pulse profile with serial number n of a certain pulsar observed locally in real time on the time axis of the local coordinate time, or a corresponding moment of the moment of a special inflection point of the pulse profile with serial number n after the addition of an initial phase of the pulse profile, on the time axis of the local coordinate time.

In an embodiment, the method for unifying time in a wide area space of the present disclosure may further include:

- determining an initial epoch of the pulsar, in which the initial epoch is a coordinate time at which the pulse with serial number 0 arrives at the origin of the wide area inertial coordinate system; and
- establishing a pulsar ephemeris according to the initial epoch.

The pulsar ephemeris is a table of correspondence between inherent information of the selected pulsar and the coordinate time, and the pulsar ephemeris includes but is not limited to the following information: a name of the pulsar, an azimuth vector of the pulsar, the pulse profile of the pulsar, an initial phase of the pulse profile, a zero-phase model of the pulse profile, a pulse period of the pulsar, a correction value of the pulse period, and a correction value of the initial phase.

Further, an expression of the pulse origin time of the pulse with serial number n includes:

$$to_n=n(T+\Delta T)+(p+\Delta p);$$

where $to_n$ is the pulse origin time of the pulse with serial number n, T is the pulse period of the pulsar, ΔT is the correction value of the pulse period, p is the initial phase of the pulse profile, and Δp is the correction value of the initial phase.

First, in the embodiment of the present disclosure, the initial epoch of the pulsar is determined first, and then the pulsar ephemeris is defined based on the initial epoch. The initial epoch refers to the coordinate time at which the pulse with the pulse serial number 0 arrives at the origin of the wide area inertial coordinate. For multiple pulsars, the initial epoch is unique. At the moment of the initial epoch, the special inflection point is specified on the pulse profile of each pulsar as the initial phase, or a model of the zero-phase point is defined when the special inflection point is not obvious (e.g., function g(x) in FIG. 6). Once the initial epoch of the pulsar is determined, subsequent pulses arriving at the origin of the wide area inertial coordinate system can be identified with consecutive pulse serial numbers. For a definite pulsar, there is a definite relationship between its serial number n (n is a natural number) and the moment $to_n$ at which the pulse with serial number n arrives at the origin of the wide area inertial coordinate system, that is, $to_n=nT$, where T is the pulse period, and this relationship is the same for different local area timekeeping systems.

More than 4,000 pulsars have been discovered so far. A pulsar suitable for being used as reference should have the following characteristics: 1) the pulse period is in a range of 1 ms~100 ms, and the period stability is better than 1E-18; 2) the pulse profile is clear, and the pulse profile is stable, preferably with easily identifiable feature points; the profile is the face of the pulsar, and there are different pulsars in the same viewing direction, so the different pulsar profiles can be distinguished only through pulse profile superposition calculation or cross-correlation calculation; 3) the pulse energy spectrum has a wide distribution, including both the electromagnetic wave energy in the radio frequency spectrum band and the electromagnetic wave energy in the X-ray spectrum band, which can not only be observed by ground radio astronomical telescopes, but also can be observed by X-ray antennas carried on the spacecraft; the pulse profiles of pulsars in different electromagnetic wave spectrum bands are different; 4) the azimuth of the pulsar is stable, and the photon energy is easy to detect; the farther the distance is, the more stable the azimuth will be; however, when the distance is far, the pulse energy will be weak and will not be easy to detect, so there is need for trade-off. At present, a large amount of data has been accumulated in the international pulsar observation. There are more than 200 pulsars suitable for being used as reference, and the pulsars selected as the reference all correspond to one pulsar ephemeris. Accumulating pulsar data for the space timekeeping systems requires the time at which the pulse of the selected pulsar arrives at the origin of the wide area inertial coordinate system (such as the solar system mass center) be taken as an argument on time axis, rather than taking the terrestrial time on geoid as a time argument, which is currently commonly used.

Figure 5:
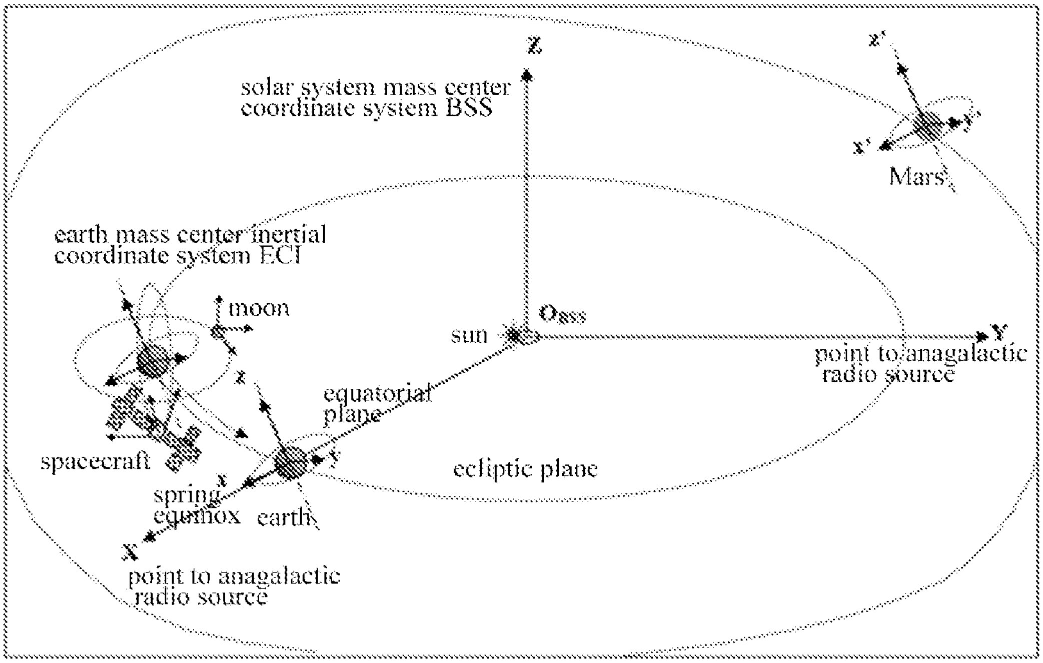
FIG. 5 is a schematic diagram of a wide area inertial coordinate system provided by an embodiment of the present disclosure.

Exemplarily, referring to FIG. 5, in an example in which the wide area inertial coordinate system of the embodiment of the present disclosure is the solar system mass center coordinate system BSS, the mass center of the solar system is set as the origin of the coordinate system, which is denoted as $O_{BSS}$, and the coordinate time can be used within the gravitational range of the solar system to unify time. It should be noted that the mass center of the solar system is not the mass center of the sun. The $O_{BSS}$ is located on the line connecting the sun and Jupiter, and is close to the sun. The rotation period of the sun around the $O_{BSS}$ is about 12 years. The celestial bodies in the solar system, such as the earth, the moon, Mars, the satellites of Mars, Jupiter, Saturn, etc., and the spacecrafts performing an inertial motion can all be regarded as independent local area timekeeping systems.

Figure 6:
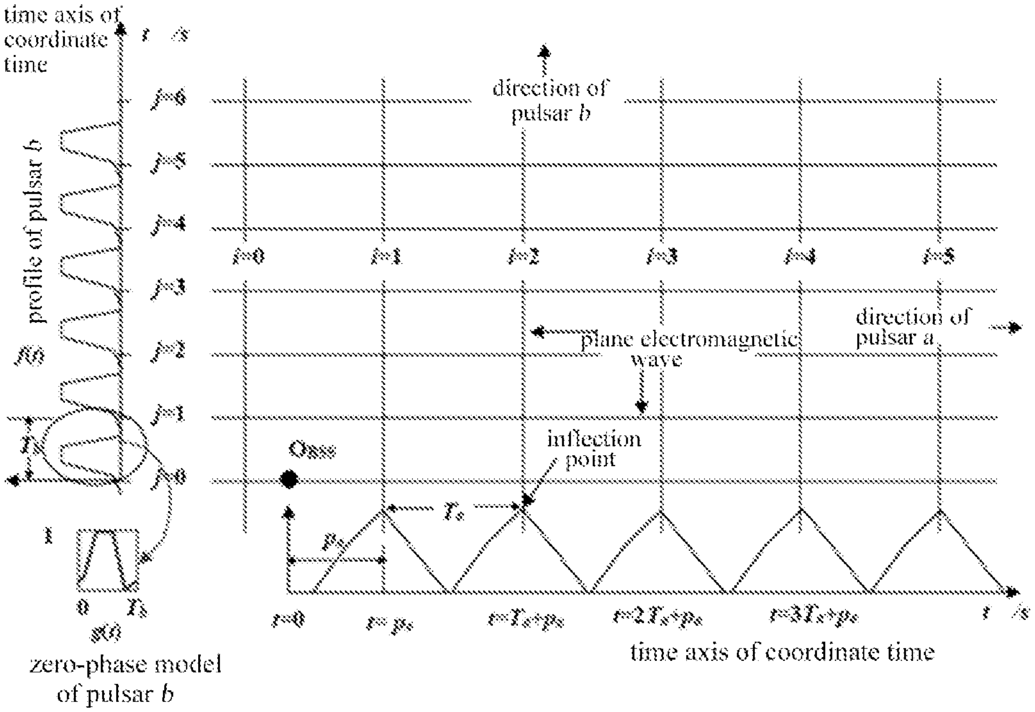
FIG. 6 is a principal diagram of determining an initial epoch of a pulsar provided by an embodiment of the present disclosure.

Further, referring to FIG. 6, it is shown that the pulse profiles of pulsar a and pulsar b arriving at the $O_{BSS}$ are energy amplitudes of plane electromagnetic waves. The pulse periods of pulsar a and pulsar b are $T_a$ and $T_b$, respectively, and the position vectors on the wide area inertial coordinate system are $(\theta_a,\varphi_a)$ and $(\theta_b,\varphi_b)$ respectively; a unit vector of pulsar a is $\vec{a}(1,\theta_a,\varphi_a)$, and a unit vector of pulsar b is $\vec{b}(1,\theta_b,\varphi_b)$; the time at which the pulse serial number i of pulsar a arrives at the $O_{BSS}$ is $t_{ai}=i(T_a+\Delta T_a)+(p_a+\Delta p_a)$, where $\Delta T_a$ is the correction value of the pulse period, and $\Delta p_a$ is the correction value of the initial phase.

Specifically, the process of determining the initial epochs of pulsar a and pulsar b is as follows: the moment t=0 is determined as the initial epoch, and there is a sharp and easily identifiable inflection point on the profile of pulsar a; if the initial phase of pulsar a is $p_a$, then the time at which the inflection point of the pulse with serial number 0 in pulsar a arrives at the $O_{BSS}$ is $t_0=p_a$; there is no easily identifiable point on the profile of pulsar b, so let the initial phase of pulsar b be $p_b=0$, and the pulse profile amplitudes of pulsar b in the period from t=0 to $t=T_b$ are normalized for waveform to obtain the zero-phase model of pulsar b; the zero-phase model and the data sequence of the measured pulse profile amplitudes from t=0 to $t=T_b$ are used to perform cross-correlation calculation, and the moment at which the cross-correlation coefficient is maximum is the pulse local time. The embodiment of the present disclosure specifies the initial phases or zero-phase models of all the candidate pulse profiles, determines the corresponding initial epochs and reaches an agreement. After the initial epochs are determined, each pulse is given a unique number, which is the pulse serial number i(i=1, 2, . . . , n), and the time axis of the coordinate time of the plane electromagnetic waves divided relative to the coordinate origin in the wide area inertial coordinate system is obtained.

Figure 2:
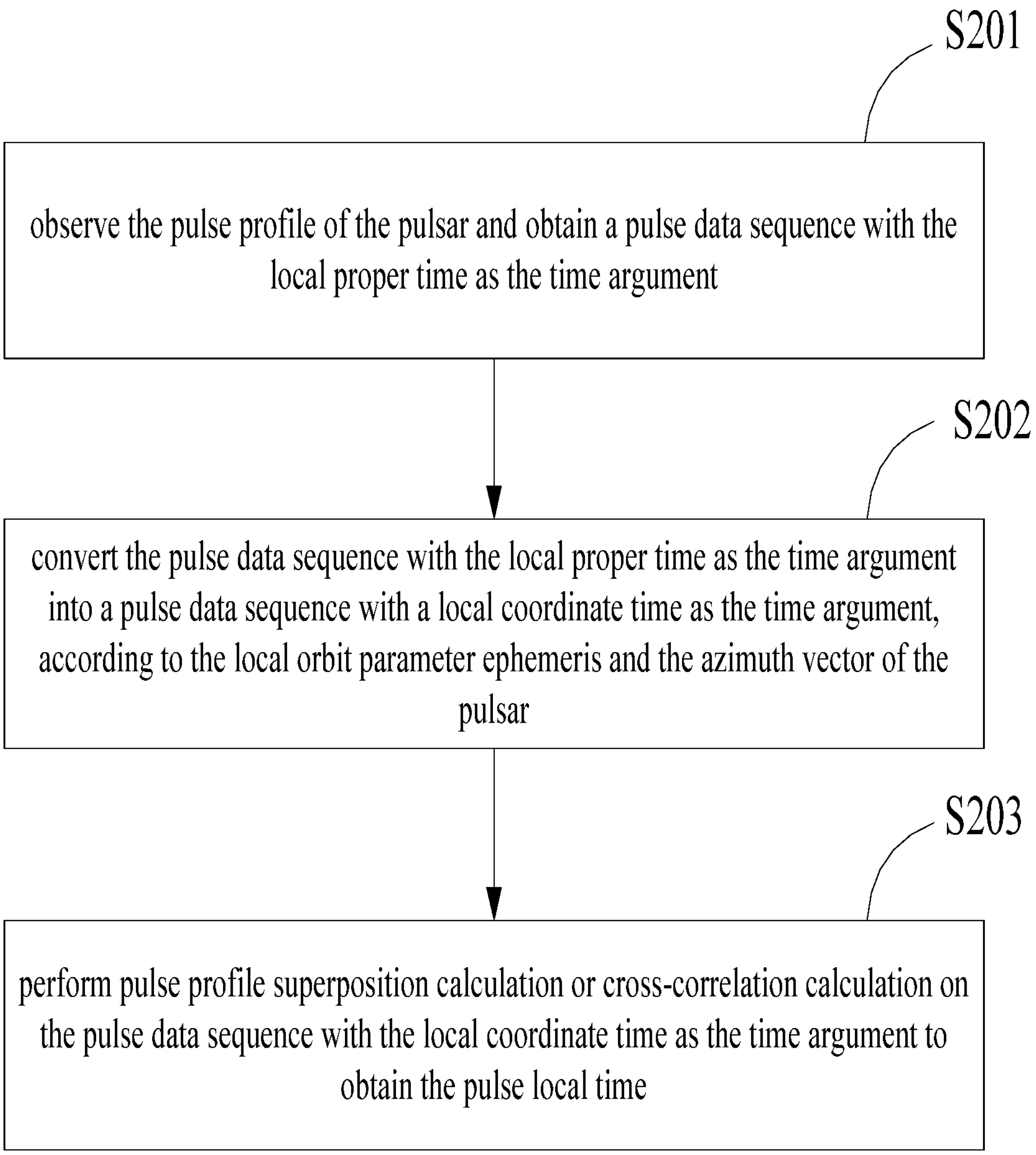
FIG. 2 is a schematic diagram showing specific flowchart of step S103 in FIG. 1.

Further, referring to FIG. 2, the specific implementation process of observing the pulse profile of the pulsar according to the local proper time and determining the pulse local time described in step S103 includes:

- step S201: observing the pulse profile of the pulsar, and obtaining a pulse data sequence with the local proper time as the time argument;
- step S202: converting the pulse data sequence with the local proper time as the time argument into a pulse data sequence with a local coordinate time as the time argument, according to the local orbit parameter ephemeris and the azimuth vector of the pulsar; and
- step S203: performing pulse profile superposition calculation or cross-correlation calculation on the pulse data sequence with the local coordinate time as the time argument to obtain the pulse local time.

As an implementation, the pulse local time can be obtained through the cross-correlation calculation or pulse profile superposition calculation. A sampling clock of a sampler in the general pulsar pulse measuring device is provided by the local proper time, and the obtained sampling data is the photon energy amplitudes measured at equally interval with the local proper time as the time argument. This is a data sequence with the local proper time as the time argument, and cannot be directly used for cross-correlation calculation or pulse profile superposition calculation. Therefore, in the embodiment of the present disclosure, the time axis of the local proper time is first transformed into the time axis of the local coordinate time to obtain a pulse data sequence expressed by the local coordinate time, and then the pulse profile superposition calculation or cross-correlation calculation is performed to obtain the pulse local time. The thus-calculated result is the accurate pulse local time, which eliminates measurement noise and improves measurement accuracy.

Specifically, since the pulse profile is very stable, the embodiment of the present disclosure uses the data sequence f(t) observed locally in real time and the “zero-phase model” of the pulse in a certain pulsar ephemeris (such as f(t) and g(t) in FIG. 6) for cross-correlation calculation to obtain R(t). The “zero-phase model” is set to g(t), which can also be referred to as pulse profile waveform curve. The moment corresponding to the maximum point of the obtained cross-correlation coefficient R(t) is the moment at which the pulse arrives at the local position, which is expressed by the coordinate time. The formula of the cross-correlation calculation is as follows:

$$R(t)=\int_{\varphi_0}^{\varphi_0+T} g(\varphi)f(t+\varphi)d\varphi;$$

where T is the pulse period of the pulsar.

The pulse profile superposition algorithm refers to cutting the pulse data sequence of multiple consecutive periods on the time axis of the coordinate time into several pieces according to the pulse period interval, and then arithmetically averaging the amplitudes of in-phase data to obtain a waveform of one period, which can effectively suppress non-integer period noises.

Figure 3:
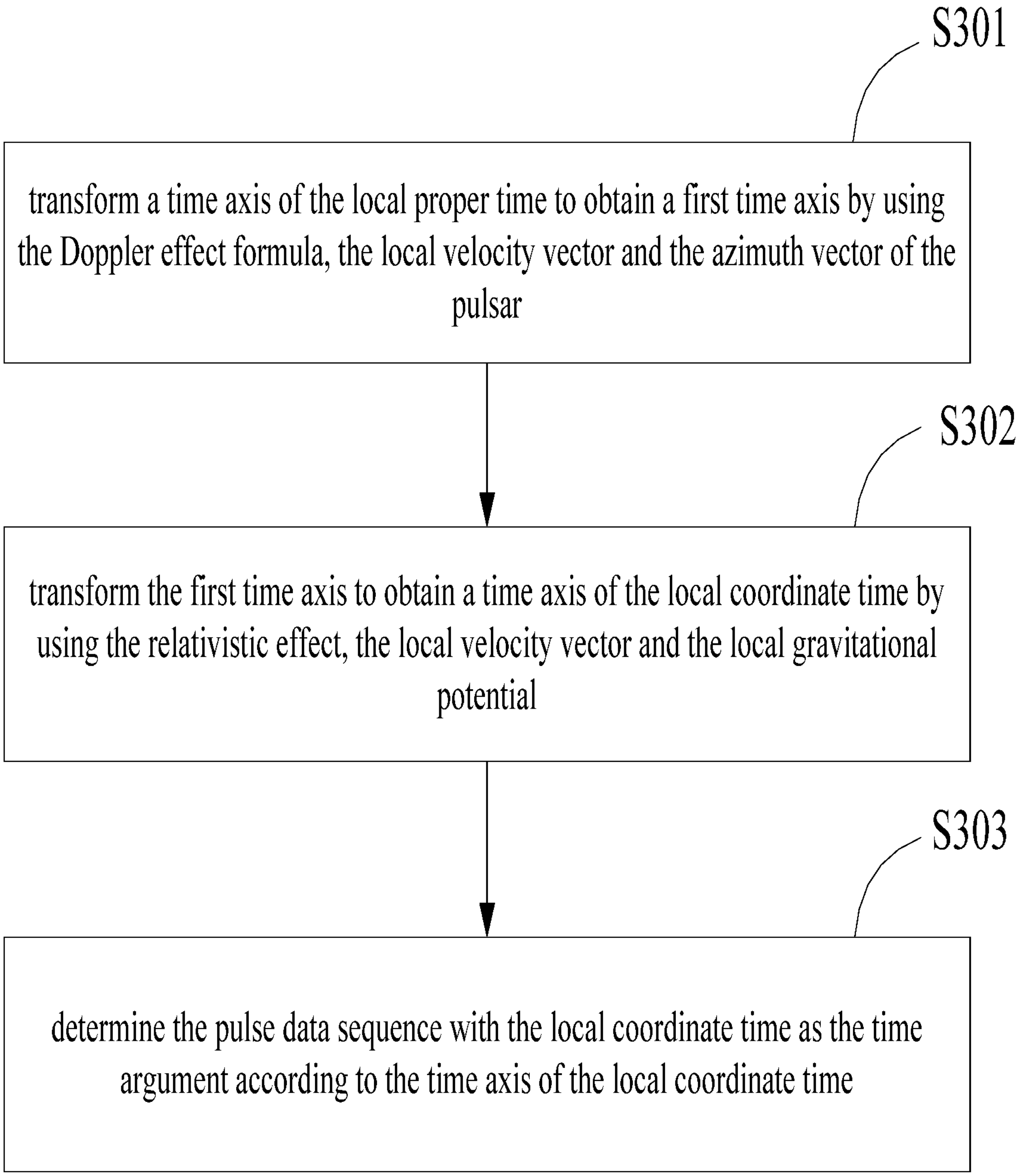
FIG. 3 is a schematic diagram showing specific flowchart of step S202 in FIG. 2.

Further, referring to FIG. 3, the specific implementation of converting the pulse data sequence with the local proper time as the time argument into the pulse data sequence with the local coordinate time as the time argument according to the local orbit parameter ephemeris and the azimuth vector of the pulsar described in step S202 includes:

step S301: transforming a time axis of the local proper time to obtain a first time axis by using the Doppler effect formula, the local velocity vector and the azimuth vector of the pulsar;

step S302: transforming the first time axis to obtain a time axis of the local coordinate time by using the relativistic effect, the local velocity vector and the local gravitational potential; and step S303: determining the pulse data sequence with the local coordinate time as the time argument according to the time axis of the local coordinate time. The embodiment of the present disclosure uses a time axis transformation algorithm to transform the pulse data sequence from the expression by local proper time to the expression by local coordinate time. The time axis transformation algorithm is a calculation method of converting the time axis of the local proper time corresponding to the amplitude of the pulse profile measurement data into the time axis of the local coordinate time, that is, the Doppler effect formula is first used to perform the time axis transformation, and then the relativistic effect is used to perform the time axis transformation. Further, the time interval $\Delta\tau_a$ of the first time axis is obtained by using the following formula:

$$\Delta\tau_a = \left(1 + \frac{V_a}{c}\right)\Delta\tau,\ V_a = \vec{a}\cdot\vec{V};$$

where $V_a$ is a local movement velocity relative to the pulsar, which is positive when approaching the pulsar, and which is negative when moving away from the pulsar, $\vec{V}$ is the local velocity vector, $\vec{a}$ is the azimuth vector of the pulsar, $\Delta\tau$ is a time interval of the time axis of the local proper time, and c is the velocity of light.

Further, the time interval $\Delta t$ of the time axis of the local coordinate time is obtained through the following formula:

$$\Delta t = \int_{\tau}^{\tau+\Delta\tau_a}\left(1 + \frac{U}{c^2} + \frac{V^2}{2c^2}\right)d\tau;$$

where t is a time variable of the local coordinate time, $\tau$ is a time variable of the local proper time, $\Delta\tau_a$ is the time interval of the first time axis, U is the local gravitational potential, V is a linear velocity of the local position relative to the wide area inertial coordinate system, which can be known from the above description, and c is the velocity of light.

Step S104: converting the pulse local time by using the local orbit parameter ephemeris so as to obtain a pulse origin time, in which the pulse origin time is a coordinate time at which the pulse arrives at an origin of the wide area inertial coordinate system.

In the embodiment of the present disclosure, the coordinate time on the wide area inertial coordinate system is used to express, transfer and unify time. The coordinate time on the wide area inertial coordinate system refers to the time measured in the unit of SI second at a position where the relative velocity is zero and the gravitational potential is zero, relative to the origin of the wide area inertial coordinate system. The position of the pulsar is approximate to the point at infinity, and the point at infinity has the characteristics conforming to the definition of the coordinate time, so the pulse emitted by the pulsar can be used as a reference for the coordinate time.

Further, the pulse origin time $to_n$ of the pulse with serial number n is obtained by using the following formula:

$$to_n = t_n + d_n/c,\ d_n = (\vec{P}\cdot\vec{a});$$

where $t_n$ is the pulse local time of the pulse with serial number n, $d_n$ is a distance from the local position at the moment $t_n$ to the origin of the wide area inertial coordinate system, $\vec{P}$ is the local position vector, $\vec{a}$ is the azimuth vector of the pulsar, and c is the velocity of light.

In an embodiment, after obtaining the pulse origin time described in step S104, the method for unifying time in the wide area space of the present disclosure may further include:

broadcasting pulse serial number information to a plurality of local area timekeeping systems, so that each of the local area timekeeping systems corrects its own pulse origin time by comparing the pulse serial number information it receives with its own pulse origin time, in which the pulse serial number information includes serial number of the current pulse and the pulse origin time corresponding to the serial number of the pulse; and acquiring the pulse serial number information sent by each of the local area timekeeping systems, and updating its own pulse origin time according to multiple pieces of pulse serial number information, so that its own time is consistent with the time of most timekeeping systems.

Figure 4:
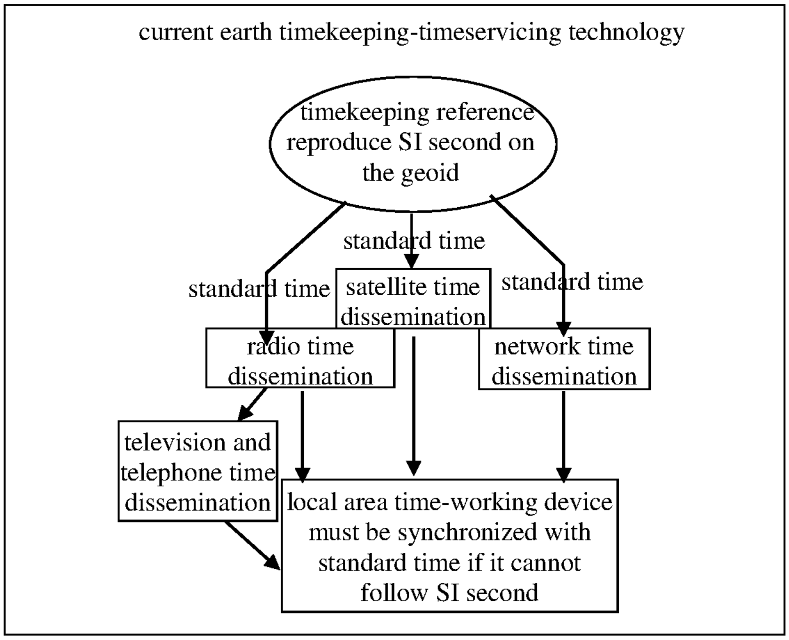
FIG. 4 is a basic principal diagram of the current earth timekeeping-timeservicing technology provided by an embodiment of the present disclosure.

The division of wide area and local area is relative. For example, a satellite orbiting the earth can be used as an independent local area timekeeping system, or it can be included in the earth timekeeping system, receiving ground time dissemination to synchronize time. These are two methods for unifying time. The method in which the satellite receives the ground time dissemination in the earth timekeeping system to synchronize time is the timekeeping-timeservicing method currently in use, as shown in FIG. 4.

The local area timekeeping system of the embodiment of the present disclosure is a system which is included in a wide area inertial coordinate system and which can independently measure time without relying on time dissemination. It can independently observe the pulse of the pulsar, and independently measure the pulse serial number and the coordinate time at which the pulse arrives at the origin of the wide area inertial coordinate system. Moreover, in the wide area inertial coordinate system, the mass center point of the system performs a stable periodic inertial motion, and is not affected by other forces than the gravity.

In practical disclosures, the space timekeeping system is composed of a plurality of local area timekeeping systems, and each of the local area timekeeping systems performs the steps of the above method for unifying time in the wide area space according to the acquired pulses to obtain the pulse serial number information and broadcast it to other local area timekeeping systems; regardless of whether other local area timekeeping systems can receive it, it is the responsibility of each local area timekeeping system to broadcast the pulse serial number information. The pulse serial number information is information for unifying time obtained by the local area timekeeping systems through the above method for unifying time in the wide area space.

When the space timekeeping system has one and only one local area timekeeping system, it does not need to unify time with other systems, and it is the timekeeping-timeservicing system currently in use on earth, so the existing time dissemination ways can be used to unify time inside the system; and when the space timekeeping system has two or more local area timekeeping systems, the pulse serial number information broadcasting process described in the present disclosure is required to unify time among the local area timekeeping systems.

As an implementation, among the plurality of local area timekeeping systems in the embodiment of the present disclosure, the ground timekeeping system has the largest weight. For example, when there are only two local area timekeeping systems, the pulse origin time of the non-ground timekeeping system should be adjusted to be consistent with the pulse origin time of the ground timekeeping system. Specifically, the non-ground timekeeping system should initially obtain the known pulse serial number information through the pulsar database accumulated on the ground and the orbital parameter information observed on the ground, and it receives the pulse serial number information of the ground timekeeping system. If it is found that there is a deviation between its own pulse serial number information and the pulse serial number information of the ground timekeeping system, the non-ground timekeeping system should actively correct its own pulse serial number information so as to be closer to the pulse serial number information of the ground timekeeping system. However, if there are more than two non-ground timekeeping systems whose pulse serial number information is consistent, and only the pulse serial number information of the ground timekeeping system is inconsistent, then the ground timekeeping system corrects its own pulse serial number information. Each local area timekeeping system broadcasts its own pulse serial number information not to adjust the time for itself, but to help other local area timekeeping systems self-check whether they deviate from the agreed time of most local area timekeeping systems, just like how the blockchain reserves scattered record information. The space timekeeping system of the embodiment of the present disclosure has the characteristic of decentralization.

As an implementation, the pulse serial number information includes but is not limited to the name of the pulsar, the serial number n of the pulse, the pulse origin time to n of the pulse n, the distance $d_n$ from the local position at the moment $t_n$ to the origin of the wide area inertial coordinate system, and a delay time $\Delta t_d$ from the moment $t_n$ to the broadcast of this pulse information.

In the embodiment of the present disclosure, the pulse serial number information is broadcast to other local area timekeeping systems, and all the local area timekeeping systems perform time monitoring according to the received pulse serial number information broadcast by other local area timekeeping systems, and constantly correct their own measurement parameters, so that the pulse serial number information in all the local areas is consistent, thus realizing time unification in the wide area space with high precision and high applicability.

The above method for unifying time in the wide area space can be used to achieve time unification among a plurality of independent local area timekeeping systems, and is suitable for other celestial bodies and spacecrafts than the earth, thereby meeting the requirement of independent time measurement without relying on the time dissemination on earth. The above method does not conflict with the existing time and frequency metrology and timekeeping-timeservicing systems on earth, but provides a new mode of unifying time in a wider range, and the current timekeeping-timeservicing technology can still be used inside the local area timekeeping systems to provide the user with the internal standard time of the local area timekeeping systems. The present disclosure also agrees on the initial epoch of the pulsar, forms system feedback by comparing the pulse serial number information, and corrects the deviation of the pulse serial number information of each local area timekeeping system itself from that of other local area timekeeping systems, so that the timekeeping system remains stable, thus achieving the goal of unifying time. The internal standard time of the local area timekeeping systems of the present disclosure is not unique, and the coordinate time of the wide area inertial coordinate system can be used as the language of unifying time after the initial epoch is agreed. The wide area inertial coordinate system is not limited to the solar system mass center coordinate system, and may also be the mass center coordinate systems of other celestial bodies.

It can be understood by those skilled in the art that the size of the sequence number of each step in the above embodiment does not mean the order of execution; the order of execution of each process should be determined by its function and internal logic, and should not limit the implementation process of the embodiment of the present disclosure in any way.

Figure 7:
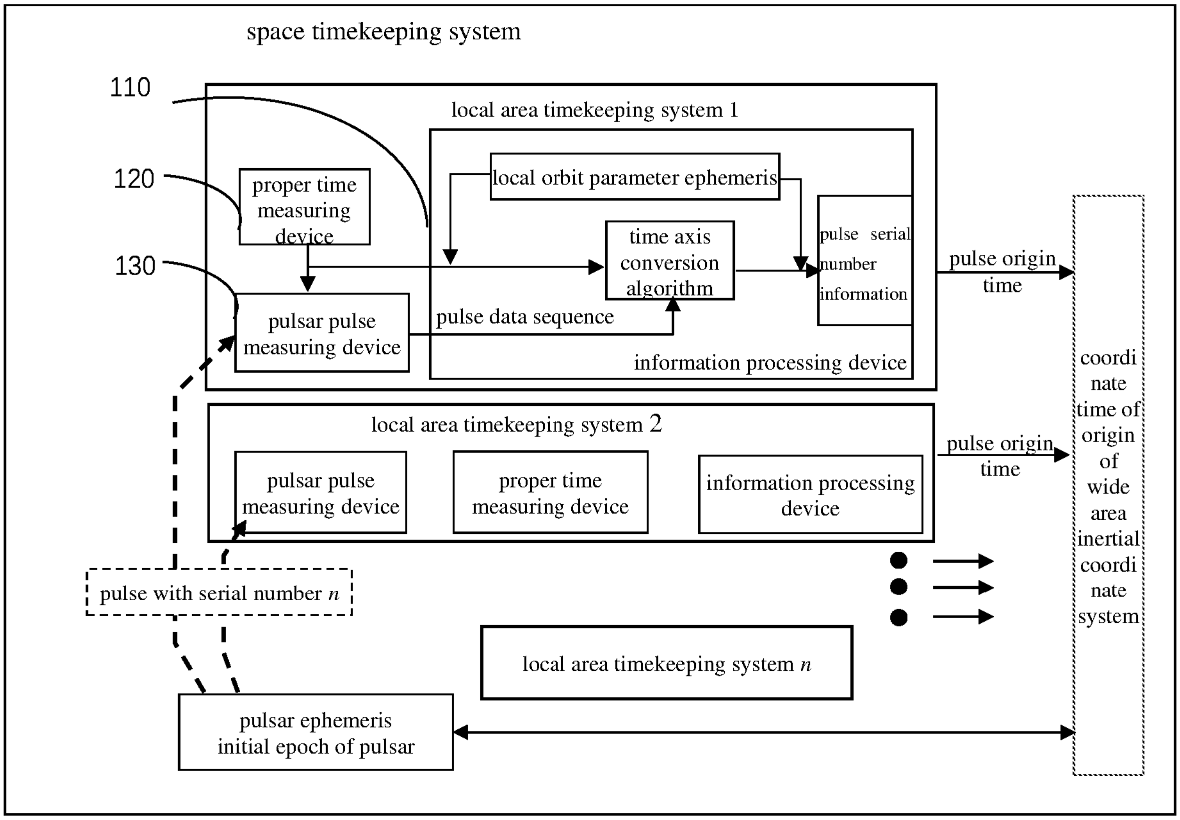
FIG. 7 is a schematic structural diagram of a space timekeeping system provided by an embodiment of the present disclosure.

Embodiments of the present disclosure also provide a space timekeeping system. Reference is made to FIG. 7, which is a schematic diagram of a specific structure of the space timekeeping system provided by an embodiment of the present disclosure. For the convenience of description, only the parts related to the embodiment of the present disclosure are shown.

The space timekeeping system of the embodiment of the present disclosure includes a plurality of local area timekeeping systems, all of which can communicate with each other, and each of which receives pulse serial number information sent by other local area timekeeping systems. As shown in FIG. 7, the space timekeeping system may include n local area timekeeping systems, where n is a positive integer. It should be understood that the embodiment of the present disclosure does not limit the number of local area timekeeping systems, which may be one, two, or plural.

Each local area timekeeping system includes an information processing device 110, a proper time measuring device 120 and a pulsar pulse measuring device 130. The proper time measuring device 120 is connected with the pulsar pulse measuring device 130 to provide a sampling time reference for the pulsar pulse measuring device 130. The proper time measuring device 120 is also connected with the information processing device 110 to provide a local proper time reference. The pulsar pulse measuring device 130 is connected with the information processing device 110, and sends the acquired data sequence of the pulse signal amplitudes to the information processing device 110. It should be understood that the embodiment of the present disclosure does not limit the ways in which the proper time measuring device 120 and the pulsar pulse measuring device 130 are connected with the information processing device 110.

Specifically, the information processing device 110 is configured to establish a wide area inertial coordinate system, which includes all local area coordinate systems within a spatial range covered by a unified time, and establish a local orbit parameter ephemeris by taking the local proper time as a time argument; the information processing device 110 is further configured to convert between the time axis of the local area coordinate system and the time axis of the wide area inertial coordinate system, look up and maintain the local orbit parameter ephemeris, broadcast and receive pulse serial number information.

The proper time measuring device 120 is a device that measures time locally in the unit of SI second. The proper time measuring device 120 is configured to obtain the local proper time, provide a time reference for the pulsar pulse measuring device 130, and provide a time variable for the local orbit parameter ephemeris of the information processing device 110.

The pulsar pulse measuring device 130 is a device capable of receiving the radiation energy of a certain band of electromagnetic waves emitted from the pulsar, and taking the energy amplitudes as a data sequence with the local proper time as an argument to provide the data sequence to the information processing device 110.

The information processing device 110 is further configured to obtain the pulse local time through two times of time axis conversion according to the pulse data sequence with the local proper time as the time argument, and to convert the pulse local time by using the local orbit parameter ephemeris to obtain the pulse origin time. The pulse origin time is the coordinate time at which the pulse arrives at the origin of the wide area inertial coordinate system.

As an implementation, the space timekeeping system of the embodiment of the present disclosure further includes: determining an initial epoch of the pulsar, in which the initial epoch is a coordinate time at which the pulse with serial number 0 arrives at the origin of the wide area inertial coordinate system; and establishing a pulsar ephemeris according to the initial epoch, in which the pulsar ephemeris includes but is not limited to the following information: a name of the pulsar, an azimuth vector of the pulsar, the pulse profile of the pulsar, an initial phase of the pulse profile, a zero-phase model of the pulse profile, a pulse period of the pulsar, a correction value of the pulse period, and a correction value of the initial phase.

Further, an expression of the pulse origin time of the pulse with serial number n includes:

$$to_n = n(T+\Delta T)+(p+\Delta p);$$

where $to_n$ is the pulse origin time of the pulse with serial number n, T is the pulse period of the pulsar, ΔT is the correction value of the pulse period, p is the initial phase of the pulse profile, and Δp is the correction value of the initial phase.

Further, the information processing device 110 is specifically configured to: obtain a pulse data sequence with the local proper time as the time argument and the azimuth vector of the pulsar; convert the pulse data sequence with the local proper time as the time argument into a pulse data sequence with the local coordinate time as the time argument, according to the local orbit parameter ephemeris and the azimuth vector of the pulsar; and perform pulse profile superposition calculation or cross-correlation calculation on the pulse data sequence with the local coordinate time as the time argument to obtain the pulse local time.

Further, the local orbital parameter ephemeris includes but is not limited to: a local position vector, a local velocity vector, and a local gravitational potential.

Correspondingly, the information processing device 110 is specifically configured to: transform a time axis of the local proper time to obtain a first time axis by using the Doppler effect formula, the local velocity vector and the azimuth vector of the pulsar; transform the first time axis to obtain a time axis of the local coordinate time by using the relativistic effect, the local velocity vector and the local gravitational potential; and determine the pulse data sequence with the local coordinate time as the time argument according to the time axis of the local coordinate time. Further, a time interval $\Delta\tau_a$ of the first time axis is obtained by using the following formula:

$$\Delta\tau_a = \left(1+\frac{V_a}{c}\right)\Delta\tau,\ V_a = \vec{a}\cdot\vec{V};$$

where $V_a$ is a local movement velocity relative to the pulsar, $\vec{V}$ is the local velocity vector, $\vec{a}$ is the azimuth vector of the pulsar, Δτ is a time interval of the time axis of the local proper time, and c is the velocity of light.

Further, a time interval Δt of the time axis of the local coordinate time is obtained by using the following formula:

$$\Delta t = \int_{\tau}^{\tau+\Delta\tau_a}\left(1+\frac{U}{c^2}+\frac{V^2}{2c^2}\right)d\tau;$$

where t is a time variable of the local coordinate time, τ is a time variable of the local proper time, $\Delta\tau_a$ is the time interval of the first time axis, U is the local gravitational potential, V is a linear velocity of the local position relative to the wide area inertial coordinate system determined according to the local velocity vector, and c is the velocity of light. The linear velocity is determined according to the local velocity vector.

Further, the pulse origin time to n of the pulse with serial number n is obtained by using the following formula:

$$to_n = t_n + d_n/c,\ d_n = (\vec{P}\cdot\vec{a});$$

where $t_n$ is the pulse local time of the pulse with serial number n, $d_n$ is a distance from the local position at the moment $t_n$ to the origin of the wide area inertial coordinate system, $\vec{P}$ is the local position vector, $\vec{a}$ is the azimuth vector of the pulsar, and c is the velocity of light.

As an implementation, the information processing device 110 of each local area timekeeping system can also be configured to:

broadcast pulse serial number information to a plurality of local area timekeeping systems, so that each of the local area timekeeping systems corrects its own pulse origin time according to the pulse serial number information it receives, in which the pulse serial number information contains serial number of the current pulse and the pulse origin time corresponding to the serial number of the pulse; and acquire the pulse serial number information sent by each of the local area timekeeping systems, and update its own pulse origin time according to multiple pieces of pulse serial number information.

The above space timekeeping system can be used to achieve time unification among a plurality of independent local area timekeeping systems, and is suitable for other celestial bodies and spacecrafts than the earth, thereby meeting the requirement of independent time measurement without relying on the time dissemination on earth. The above method does not conflict with the existing time and frequency metrology and timekeeping-timeservicing systems on earth, but provides a new mode of unifying time in a wider range, and the current timekeeping-timeservicing technology can still be used inside the local area timekeeping systems to provide the user with the internal standard time of the local area timekeeping systems. The present disclosure also agrees on the initial epoch of the pulsar, forms system feedback by comparing the pulse serial number information, and corrects the deviation of the pulse serial number information of each local area timekeeping system itself from that of other local area timekeeping systems, so that the timekeeping system remains stable, thus achieving the goal of unifying time. The internal standard time of the local area timekeeping systems of the embodiment of the present disclosure is not unique, and the coordinate time of the wide area inertial coordinate system can be used as the language of unifying time after the initial epoch is agreed. The wide area inertial coordinate system is not limited to the solar system mass center coordinate system, and may also be the mass center coordinate systems of other celestial bodies.

The above embodiments are only used to illustrate the technical solutions of the present disclosure, but not to limit them; although the present disclosure has been described in detail with reference to the above embodiments, it should be understood by those skilled in the art that the technical solutions described in the above embodiments can still be modified, or some technical features thereof can also be equivalently replaced; these modifications or replacements will not make the essence of the corresponding technical solutions depart from the spirit and scope of the technical solutions in the embodiments of the present disclosure, and should all be included within the scope of protection of the present disclosure.

The invention claimed is:

1. A method for unifying time in a wide area space, comprising:

establishing a wide area inertial coordinate system, via an information processing device, which comprises all local area coordinate systems within a spatial range covered by a unified time;

obtaining a local proper time, via a proper time measuring device, and establishing a local orbit parameter ephemeris by taking the local proper time as a time argument;

observing a pulse profile of a pulsar, via a pulsar pulse measuring device, according to the local proper time, and determining a pulse local time, wherein the pulse local time is a coordinate time at which the pulse of the pulsar arrives at a local position; and converting the pulse local time by using the local orbit parameter ephemeris, via the information processing device, so as to obtain a pulse origin time, wherein the pulse origin time is a coordinate time at which the pulse arrives at an origin of the wide area inertial coordinate system;

wherein the proper time measuring device comprises a ground cesium atomic clock, and the pulsar pulse measuring device comprises a large-scale ground radio astronomical telescope or antennas for measuring X-rays on satellites;

thus achieving time unification among a plurality of local area timekeeping systems;

wherein after obtaining the pulse origin time, broadcasting pulse serial number information to the plurality of local area timekeeping systems, so that each of the local area timekeeping systems corrects its own pulse origin time according to the pulse serial number information it receives, wherein the pulse serial number information contains serial number of the current pulse and the pulse origin time corresponding to the serial number of the pulse; and acquiring the pulse serial number information sent by each of the local area timekeeping systems, and updating its own pulse origin time according to multiple pieces of pulse serial number information; and wherein the observing the pulse profile of the pulsar according to the local proper time and determining the pulse local time comprises:

observing the pulse profile of the pulsar, and obtaining a pulse data sequence with the local proper time as the time argument;

converting the pulse data sequence with the local proper time as the time argument into a pulse data sequence with a local coordinate time as the time argument, according to the local orbit parameter ephemeris and the azimuth vector of the pulsar; and performing pulse profile superposition calculation or cross-correlation calculation on the pulse data sequence with the local coordinate time as the time argument to obtain the pulse local time; and wherein the converting the pulse local time by using the local orbit parameter ephemeris to obtain the pulse origin time comprises:

obtaining the pulse origin time $to_n$ of the pulse with serial number n by using:

$$to_n=t_n+d_n/c,\ d_n=(\vec{P}\cdot\vec{a});$$

where $t_n$ is the pulse local time of the pulse with serial number n, $d_n$ is a distance from the local position at the moment $t_n$ to the origin of the wide area inertial coordinate system, $\vec{P}$ is the local position vector, $\vec{a}$ is the azimuth vector of the pulsar, and c is the velocity of light.

2. The method for unifying time in the wide area space according to claim 1, further comprising:

determining an initial epoch of the pulsar, wherein the initial epoch is a coordinate time at which the pulse with serial number 0 arrives at the origin of the wide area inertial coordinate system; and establishing a pulsar ephemeris according to the initial epoch, wherein the pulsar ephemeris comprises a name of the pulsar, an azimuth vector of the pulsar, the pulse profile of the pulsar, an initial phase of the pulse profile, a zero-phase model of the pulse profile, a pulse period of the pulsar, a correction value of the pulse period, and a correction value of the initial phase.

3. The method for unifying time in the wide area space according to claim 2, wherein an expression of the pulse origin time of the pulse with serial number n comprises:

$$to_n=n(T+\Delta T)+(p+\Delta p);$$

where $to_n$ is the pulse origin time of the pulse with serial number n, T is the pulse period of the pulsar, $\Delta T$ is the correction value of the pulse period, p is the initial phase of the pulse profile, and $\Delta p$ is the correction value of the initial phase.

4. The method for unifying time in the wide area space according to claim 2, wherein the local orbital parameter ephemeris comprises: a local position vector, a local velocity vector, and a local gravitational potential;

correspondingly, the converting the pulse data sequence with the local proper time as the time argument into the pulse data sequence with the local coordinate time as the time argument according to the local orbit parameter ephemeris and the azimuth vector of the pulsar comprises:

transforming a time axis of the local proper time to obtain a first time axis by using the Doppler effect formula, the local velocity vector and the azimuth vector of the pulsar;

transforming the first time axis to obtain a time axis of the local coordinate time by using the relativistic effect, the local velocity vector and the local gravitational potential; and determining the pulse data sequence with the local coordinate time as the time argument according to the time axis of the local coordinate time.

5. The method for unifying time in the wide area space according to claim 4, wherein the transforming the time axis of the local proper time to obtain the first time axis by using the Doppler effect formula, the local velocity vector and the azimuth vector of the pulsar comprises:

obtaining a time interval $\Delta\tau_a$ of the first time axis by using:

$$\Delta\tau_a = \left(1 + \frac{V_a}{c}\right)\Delta\tau,\ V_a = \vec{a}\cdot\vec{V};$$

a where $V_a$ is a local movement velocity relative to the pulsar, $\vec{V}$ is the local velocity vector, $\vec{a}$ is the azimuth vector of the pulsar, $\Delta\tau$ is a time interval of the time axis of the local proper time, and c is the velocity of light.

6. The method for unifying time in the wide area space according to claim 4, wherein the transforming the first time axis to obtain the time axis of the local coordinate time by using the relativistic effect, the local velocity vector and the local gravitational potential comprises:

obtaining a time interval $\Delta t$ of the time axis of the local coordinate time by using:

$$\Delta t = \int_{\tau}^{\tau+\Delta\tau_a}\left(1 + \frac{U}{c^2} + \frac{V^2}{2c^2}\right)d\tau;$$

where t is a time variable of the local coordinate time, $\tau$ is a time variable of the local proper time, $\Delta\tau_a$ is a time interval of the first time axis, U is the local gravitational potential, Vis a linear velocity of the local position relative to the wide area inertial coordinate system determined according to the local velocity vector, and c is the velocity of light.

7. A space timekeeping system, comprising a plurality of local area timekeeping systems, wherein each of the local area timekeeping systems comprises an information processing device, a proper time measuring device, and a pulsar pulse measuring device;

the information processing device is configured to establish a wide area inertial coordinate system, which comprises all local area coordinate systems within a spatial range covered by a unified time;

the proper time measuring device is configured to obtain a local proper time; and the information processing device is further configured to establish a local orbit parameter ephemeris by taking the local proper time as a time argument;

the pulsar pulse measuring device is configured to observe a pulse profile of a pulsar according to the local proper time to obtain a pulse data sequence with the local proper time as the time argument; and the information processing device is further configured to determine a pulse local time according to the pulse data sequence with the local proper time as the time argument, wherein the pulse local time is a coordinate time at which the pulse of the pulsar arrives at a local position; and the information processing device is further configured to convert the pulse local time by using the local orbit parameter ephemeris so as to obtain a pulse origin time, wherein the pulse origin time is a coordinate time at which the pulse arrives at an origin of the wide area inertial coordinate system;

wherein the proper time measuring device comprises a ground cesium atomic clock, and the pulsar pulse measuring device comprises a large-scale ground radio astronomical telescope or antennas for measuring X-rays on satellites;

thus achieving time unification among the plurality of local area timekeeping systems;

wherein the information processing device of each local area timekeeping system is further configured to:

broadcast pulse serial number information to the plurality of local area timekeeping systems, so that each of the local area timekeeping systems corrects its own pulse origin time according to the pulse serial number information it receives, wherein the pulse serial number information contains serial number of the current pulse and the pulse origin time corresponding to the serial number of the pulse; and acquire the pulse serial number information sent by each of the local area timekeeping systems, and update its own pulse origin time according to multiple pieces of pulse serial number information; and wherein the observing the pulse profile of the pulsar according to the local proper time and determining the pulse local time comprises:

observing the pulse profile of the pulsar, and obtaining a pulse data sequence with the local proper time as the time argument;

converting the pulse data sequence with the local proper time as the time argument into a pulse data sequence with a local coordinate time as the time argument, according to the local orbit parameter ephemeris and the azimuth vector of the pulsar; and performing pulse profile superposition calculation or cross-correlation calculation on the pulse data sequence with the local coordinate time as the time argument to obtain the pulse local time; and wherein the converting the pulse local time by using the local orbit parameter ephemeris to obtain the pulse origin time comprises:

obtaining the pulse origin time $to_n$ of the pulse with serial number n by using:

$$to_n = t_n + d_n/c,\ d_n = (\vec{P}\cdot\vec{a});$$

where $t_n$ is the pulse local time of the pulse with serial number n, $d_n$ is a distance from the local position at the moment $t_n$ to the origin of the wide area inertial coordinate system, $\vec{P}$ is the local position vector, $\vec{a}$ is the azimuth vector of the pulsar, and c is the velocity of light.

* * * * *